2,816,020

United States Patent Office

Patented Dec. 10, 1957

2,816,020

METHOD OF PRODUCING TITANIUM

James Paterson Quin, Widnes, England, assignor to Imperial Chemical Industries Limited, London, England, a corporation of Great Britain No Drawing. Application June 29, 1956,
Serial No. 594,690

Claims priority, application Great Britain July 4, 1955

10 Claims. (Cl. 75—84.5)

This invention relates to the manufacture of metals and more particularly to improvements in the manufacture of metallic titanium.

One method for the manufacture of metallic titanium comprises the reaction of sodium with titanium tetrachloride preferably at a temperature between 800° and 900° C. and in the presence of an atmosphere inert to the reactants and reaction products. After reaction is complete the resulting mixture of titanium and sodium chloride is cooled in an inert atmosphere and then ground to a powder before leaching in an aqueous solution to dissolve out the sodium chloride. The titanium so isolated is in the form of sponge which requires conversion to a ductile titanium and this is effected by arc melting preferably in an arc furnace in the presence of an inert gas.

It has been found, however, that titanium sponge obtained by the general method aforedescribed contains an appreciable quantity of hydrogen and the presence of this has a deleterious effect on the melted titanium product in causing embrittlement.

Another difficulty caused by the presence of hydrogen in the titanium is in the process of arc melting the titanium sponge. The evolution of hydrogen gas during the melting operation tends to have an adverse effect on the stability of the electric arc and a particular difficulty is caused by the evolved hydrogen blowing about the fine particles of sponge and upsetting the equilibrium conditions of working. One method which has found practical application in coping with these problems has been to remove the hydrogen before arc melting by subjecting the sponge to a prior degassing treatment but this is a time-consuming and costly operation not commendable on a commercial scale.

We have now found that titanium metal of low hydrogen content can be obtained by so conducting the reaction between titanium tetrachloride and sodium that subchlorides of titanium are present in the reaction product and then leaching the crushed reaction product in an aqueous medium containing a mineral acid and a soluble formate or oxalate.

In a process for the manufacture of titanium by the reaction of titanium tetrachloride with metallic sodium in an inert atmosphere and isolating titanium from the products by leaching in an aqueous solution the present invention comprises the improvement whereby titanium of low hydrogen content is obtained which includes carrying out the said reaction in the presence of lower chlorides of titanium and then leaching the products with an aqueous solution of a mineral acid containing a soluble formate or oxalate or mixture of the same. Advantageously the soluble formate or oxalate is an alkali metal formate or oxalate.

The presence in the reaction product of subchlorides of titanium can be readily assured by using in the reaction a slight excess of titanium tetrachloride; advantageously we use more than 0.25% by weight over the stoichiometric quantity but we prefer to employ an excess of between 0.5% to 3.0% by weight.

A suitable method of carrying out the invention is to react molten sodium with a slight excess of titanium tetrachloride at 850° in an atmosphere of argon. When the reaction is complete the products are cooled in the same inert atmosphere and then crushed and ground to powder. The powdered material is then leached with a weak solution of hydrochloric acid containing a small quantity of sodium formate or sodium oxalate, for instance, a solution containing 2% of hydrogen chloride and 1% of sodium formate or sodium oxalate. We prefer, however, that the acidified solution should contain between 0.5% and 2.0% by weight of sodium formate or sodium oxalate. After stirring for 35 minutes at ordinary temperature the aqueous solution containing dissolved sodium chloride is decanted off and a further leaching carried out to ensure that all traces of soluble products are removed. The remaining titanium is then washed and dried.

The following example illustrates but does not limit our invention:

*Example*

Sodium was reacted with a 0.7% excess of titanium tetrachloride over the stoichiometric proportion at approximately 850° C. in an atmosphere of argon. When the reaction was complete the products were cooled in the same inert atmosphere and then crushed and ground to powder. A portion of the titanium powder was then leached with an aqueous solution containing 2% hydrochloric acid and 1% sodium formate. After stirring for 30 minutes at room temperature the aqueous solution containing dissolved sodium salt was decanted off and a further leaching carried out with an aqueous solution containing 2% hydrochloric acid to ensure that all traces of soluble products were removed. The titanium metal was then washed and dried. The hydrogen content of the metal so prepared was found to be 0.002%.

A second portion of the powder was treated in a similar manner except that the additive was sodium oxalate. The final metal was found to have a hydrogen content of 0.003%.

A third portion of the titanium powder was then leached with an aqueous solution containing 2% hydrochloric acid in the manner described above without the presence of any additives. The titanium metal so prepared was found to contain 0.005% hydrogen.

What I claim is:

1. In a process for the manufacture of titanium by the reaction of titanium tetrachloride with metallic sodium in an inert atmosphere and isolating titanium from the reaction product by leaching in an aqueous solution, the improvement whereby titanium of low hydrogen content is obtained which comprises carrying out the said reaction in the presence of lower chlorides of titanium and leaching the reaction product containing said lower chlorides of titanium with an aqueous solution of a mineral acid containing a member of the group consisting of soluble formates, oxalates and mixtures of the same.

2. An improved process according to claim 1 in which leaching of the aforesaid product is carried out with an aqueous solution of a mineral acid containing an alkali metal formate.

3. An improved process according to claim 1 in which the presence of the aforesaid lower chlorides of titanium is conditioned by carrying out the reaction between titanium tetrachloride and sodium using an excess of titanium tetrachloride amounting to more than 0.25% by weight of the stoichiometric quantity.

4. An improved process according to claim 1 in which the reaction product is leached with an aqueous solution of a mineral acid containing not more than 10% by weight of sodium formate.

5. An improved process according to claim 4 in which leaching is carried out in an aqueous solution of a mineral acid which contains between 0.5% and 2% by weight of sodium formate.

6. An improved process according to claim 1 in which leaching of the aforesaid product is carried out with an aqueous solution of a mineral acid containing an alkali metal oxalate.

7. An improved process according to claim 6 in which leaching is carried out in an aqueous solution of a mineral acid which contains between 0.5% and 2% by weight of sodium oxalate.

8. The process of claim 3 wherein the excess titanium tetrachloride is between 0.5% and 3.0% by weight of the stoichiometric quantity.

9. An improved process according to claim 1 in which leaching of the aforesaid product is carried out with an aqueous solution of a mineral acid containing an alkali metal formate and an alkali metal oxalate.

10. In a process for the manufacture of titanium by the reaction of titanium tetrachloride with metallic sodium in an inert atmosphere and isolating titanium from the reaction product by leaching in an aqueous solution, the improvement whereby titanium of low hydrogen content is obtained which comprises reacting said titanium tetrachloride and metallic sodium to obtain a reaction product containing a lower chloride of titanium and leaching the product containing said lower chloride with an aqueous solution of an alkali metal salt selected from the group consisting of alkali metal formates, alkali metal oxalates and mixtures of the same.

References Cited in the file of this patent

FOREIGN PATENTS 726,367      Great Britain _____ Mar. 16, 1955